(12) United States Patent
Allen

(10) Patent No.: US 7,511,619 B2
(45) Date of Patent: Mar. 31, 2009

(54) VEHICLE LOCATING METHOD AND SYSTEM

(75) Inventor: Ira Lee Allen, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 11/689,328

(22) Filed: Mar. 21, 2007

(65) Prior Publication Data

US 2007/0171069 A1   Jul. 26, 2007

Related U.S. Application Data

(63) Continuation of application No. 11/062,685, filed on Feb. 22, 2005, now Pat. No. 7,323,989.

(51) Int. Cl.
*G06Q 10/00* (2006.01)

(52) U.S. Cl. ............... 340/572.1; 340/572.4; 340/10.1; 340/539.13; 340/825.36; 705/26

(58) Field of Classification Search ... 340/572.1–572.8, 340/10.1, 10.4, 539.13, 539.32, 825.36, 825.49; 701/29–35; 700/213–230; 235/375–376, 235/385; 705/22, 26
See application file for complete search history.

(56) References Cited

U.S. PATENT DOCUMENTS

| | | | | |
|---|---|---|---|---|
| 6,339,736 | B1 * | 1/2002 | Moskowitz et al. | 701/29 |
| 7,356,393 | B1 * | 4/2008 | Schlatre et al. | 701/33 |
| 2003/0111525 | A1 * | 6/2003 | Sweeney et al. | 235/376 |
| 2005/0073435 | A1 * | 4/2005 | Voeller et al. | 340/933 |
| 2006/0229928 | A1 * | 10/2006 | Nix, Jr. | 705/9 |
| 2008/0027604 | A1 * | 1/2008 | Oesterling | 701/30 |

* cited by examiner

*Primary Examiner*—Toan N Pham
(74) *Attorney, Agent, or Firm*—Dillon & Yudell LLP

(57) ABSTRACT

A method and service that uses radio frequency identification (RFID) tags to track and monitor vehicles that are being service is presented. Each vehicle has an attached RFID tag that contains detailed information about that vehicle. A customer can log onto a website hosted by a service department. The website is populated with real-time data showing the current service area in which the vehicle is located.

16 Claims, 12 Drawing Sheets

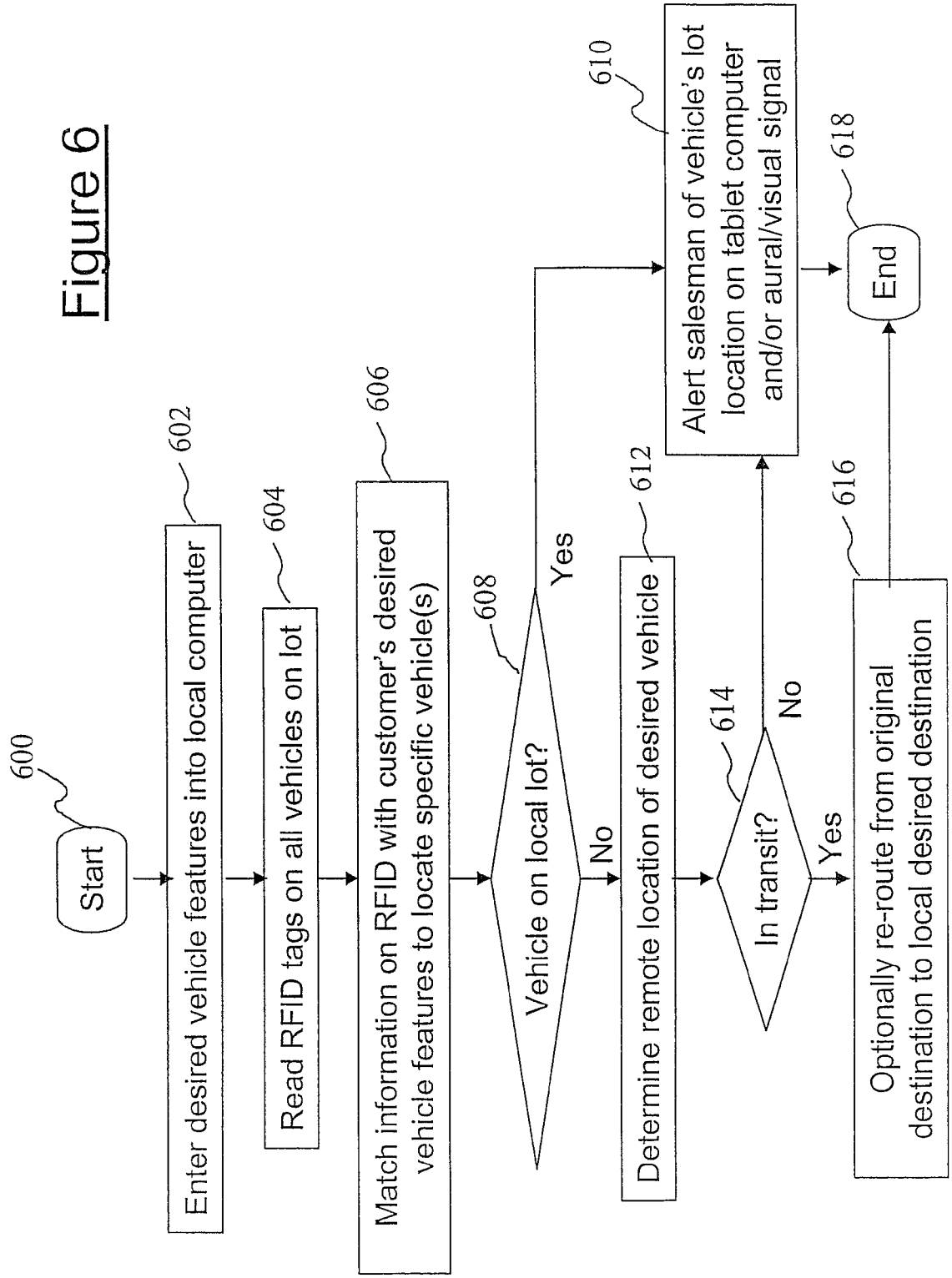

VEHICLE LOCATING METHOD AND SYSTEM

RELATED PATENT APPLICATIONS

The present application is a continuation of U.S. patent application Ser. No. 11/062,685, filed on Feb. 22, 2005 now U.S. Pat. No. 7,323,989, and entitled, "Product Locating Method and System," which is incorporated herein by reference.

BACKGROUND OF THE INVENTION

1. Technical Field

The present invention relates in general to the field of computers, and in particular to computer systems that use radio frequency identification (RFID) technology. Still more particularly, the present invention relates to a method and service for physically locating a product, such as a vehicle, that is being serviced.

2. Description of the Related Art

A customer's experience in purchasing a major product, including a vehicle such as a car, truck or boat, is typically a difficult ordeal. In a usual scenario, the customer tells a sales representative generally what he is looking for, and the sales representative then physically looks over inventory on the lot to find a likely match. The sales representative locates keys for a selected vehicle, often after first speaking with a sales manager, and then takes the customer onto the lot to look at the selected vehicle. The customer often decides that the selected vehicle does not meet his needs/desires, and the cycle starts over again with another vehicle.

Likewise, after the sale is it difficult for the customer to check on a status of the vehicle when being serviced (maintenance, repairs, etc.). The customer must contact his service representative, who is often on another call or otherwise unavailable, who must then track down the vehicle to determine the completion status of the service work being performed.

SUMMARY OF THE INVENTION

What is needed, therefore, is a method and system that locates and tracks a product that is being serviced.

Thus, the present invention is directed to a method and service that uses radio frequency identification (RFID) tags to track and monitor vehicles that are being serviced. Each vehicle has an attached RFID tag that contains detailed information about that vehicle. A customer can log onto a website hosted by a service department. The website is populated with real-time data showing the current service area in which the vehicle is located.

In one embodiment, the service department has a specific service procedure that describes the order in which service steps will be performed on each vehicle, and in which physical areas of the service shop, thus allowing the customer to know how many more stations are needed to be visited by that vehicle before the service is completed.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 6 is a flow chart of steps taken in a preferred embodiment of the present invention for locating and tracking a vehicle.

DETAILED DESCRIPTION OF THE PREFERRED EMBODIMENT

Figure 1:
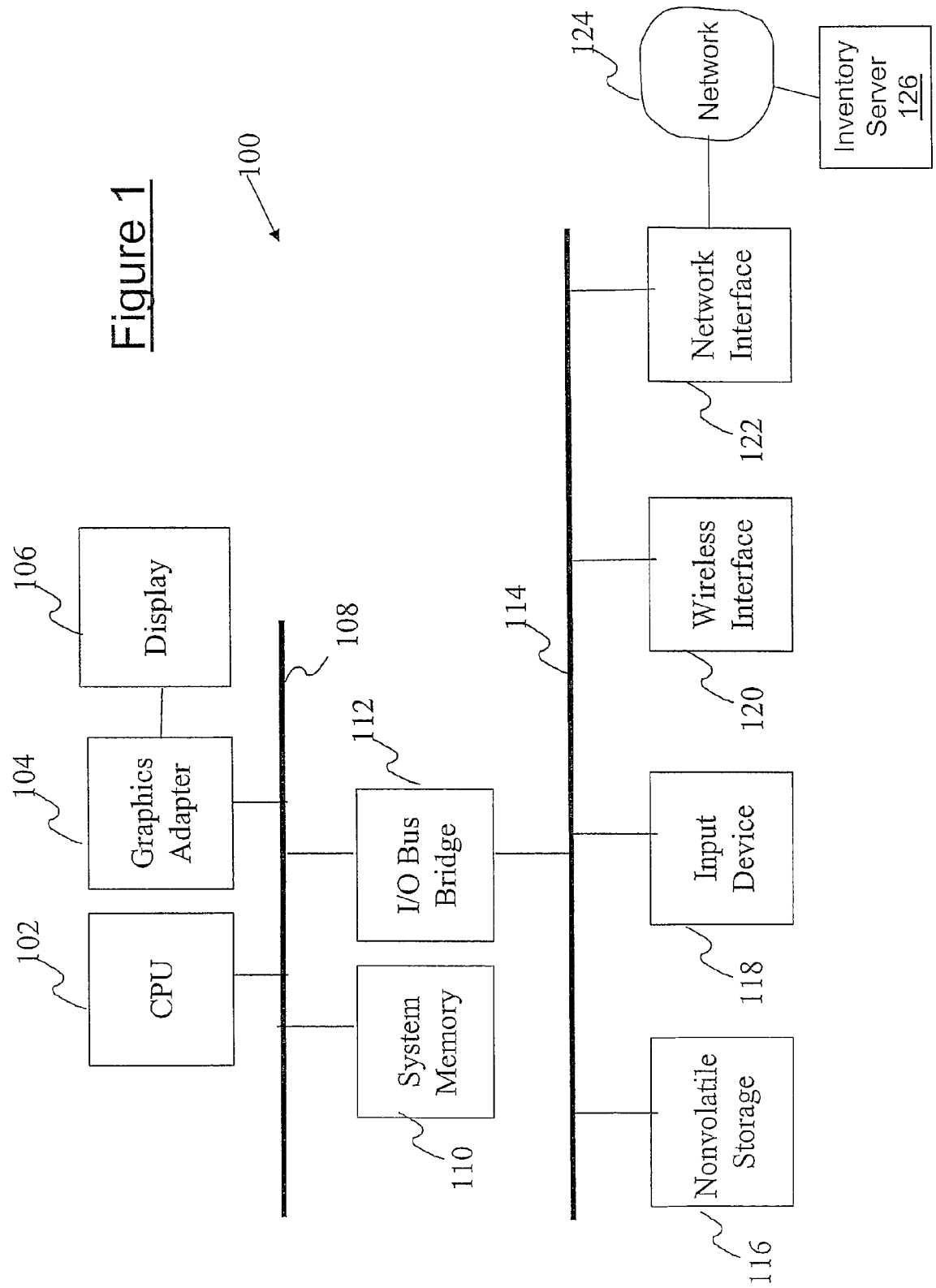
FIG. 1 is a block diagram of an exemplary computer system that may be used by a wireless tablet computer and by a wireless radio frequency identification (RFID) controller/server according to the present invention.

With reference now to the figures, and in particular to FIG. 1, there is depicted a block diagram of an exemplary data processing system 100 in which a preferred embodiment of the present invention may be implemented. Specifically, data processing system 100 describes in general terms hardware that may be used by a wireless radio frequency identification (RFID) controller/server 208 and by a wireless tablet computer 210 shown in FIG. 2.

Data processing system 100 includes a central processing unit (CPU) 102, which is connected to a system bus 108. In the exemplary embodiment, data processing system 100 includes a graphics adapter 104, which is also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, optical drive, or similar mass storage device(s). Also attached to I/O bus 114 is an input device 118, which may include a conventional mouse, a trackball, or the like, as well as a keyboard or similar device.

Figure 2:
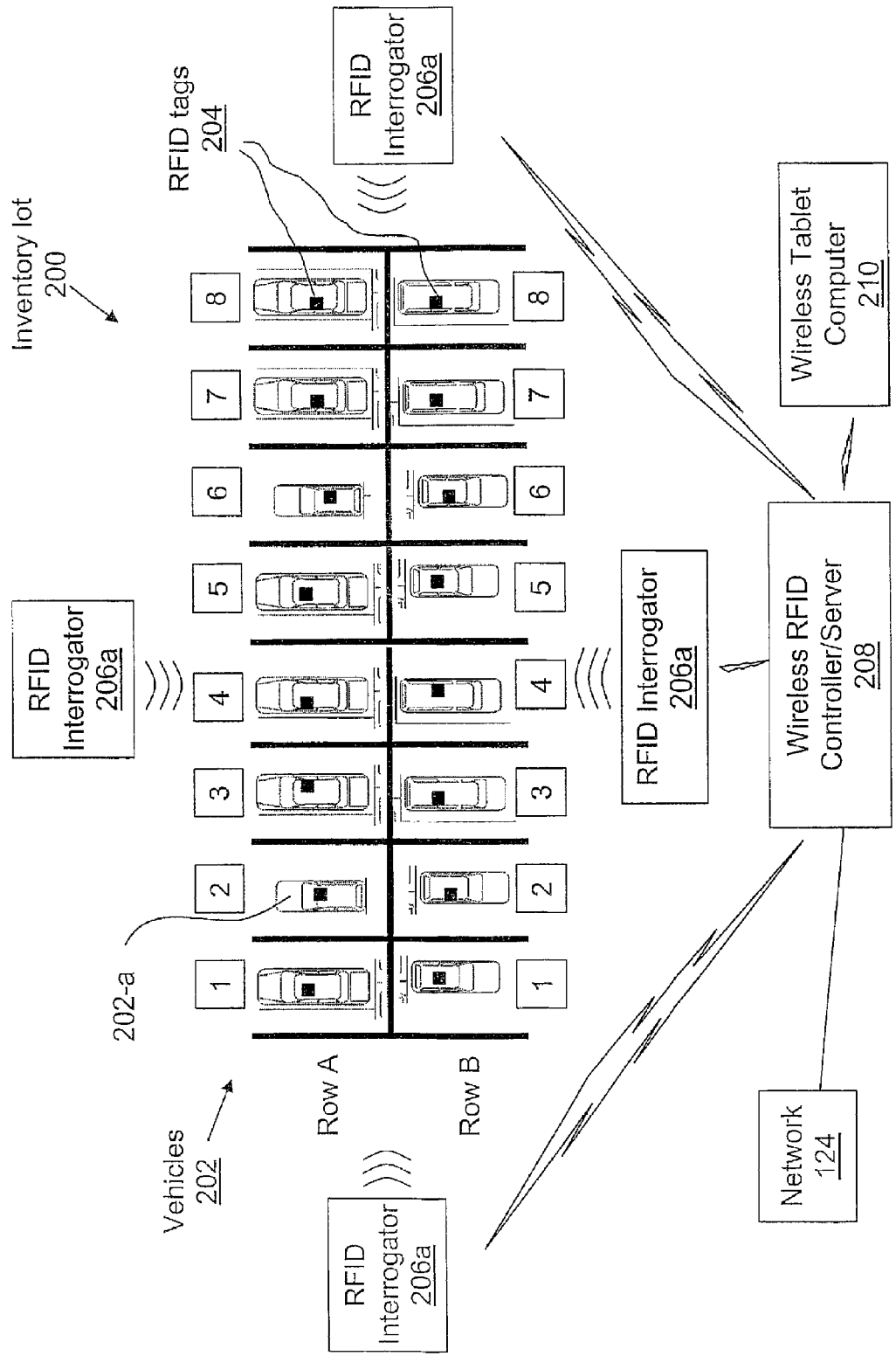
FIG. 2 is a block diagram of a inventory lot having RFID interrogators for identifying and locating vehicles that match the requirements of a customer.

Also coupled to I/O bus 114 is a wireless interface 120, which provides wireless communication with wireless devices, including radio frequency identification (RFID) tags (such as RFID tags 204 shown in FIG. 2).

Also coupled to I/O bus 114 is a network interface 122, which provides network communication via a network 124 to remote computing systems. Coupled to network 124 is an inventory server 126, which contains a database of inventory that is available on a local lot, a remote lot, or is in transit, as well as products that can be ordered from the manufacturer.

The exemplary embodiment shown in FIG. 1 is provided solely for the purposes of explaining the invention and those skilled in the art will recognize that numerous variations are possible, both in form and function. For instance, data processing system 100 might also include a sound card and audio speakers, and numerous other optional components. All such variations are believed to be within the spirit and scope of the present invention.

With reference now to FIG. 2, there is depicted an inventory lot 200 in which the present invention may be implemented. As discussed below, inventory lot 200 may be a local lot, or it may be a remote lot. Located on inventory lot 200 are vehicles 202. Attached to each vehicle 202 is a radio frequency identification (RFID) tag 204. Each RFID tag 204 may be attached to a vehicle 202 by either a manufacturer of the vehicle 202, or it may be attached "after market" by a sales or service enterprise.

Each RFID tag 204 contains information specific to the vehicle 202 to which that RFID tag 204 is attached. This information may include, but is not limited to, the vehicle identification number (VIN), make, model, features, color, manufacturer's suggested retail price (MSRP), dealer's cost (before and after dealer incentives), availability (how many other similar vehicles are in the dealer's inventory), staleness (how long the vehicle has been sitting on the dealer's lot), new, demonstrator or used status, and available financing (including special interest rates offered by the manufacturer) of the vehicle 202.

Each RFID tag 204 (also known as an RFID transponder) is interrogated by one or more RFID interrogators 206 (also known as an RFID reader). Each RFID tag 204 includes a radio frequency integrated circuit (RFIC) and an antenna (not shown, but known and understood to those skilled in the art). Each RFID interrogator 206 includes an antenna and a transceiver, which includes a transmitter and a receiver (not shown, but known and understood to those skilled in the art).

Wirelessly coupled to each RFID interrogator 206 is a wireless RFID controller/server 208, which includes hardware and software for interrogating and decoding information from the RFID interrogators 206. Alternatively, the structure and/or function of the RFID interrogators 206 and the wireless RFID controller/server 208 may be integrated into a single package.

Communication between the RFID tags 204 and the RFID interrogators 206 may be passive, semi-passive, or active. In the passive mode, the RFID interrogators 206 send an interrogation radio frequency signal of appropriate frequency and strength to provide power to the RFID tags 204. In the semi-passive and active modes, power is supplied to the RFID tags 204 by an on-board battery. In the semi-passive mode, the RFID tag 204 either acts in response to an interrogation from an RFID interrogator 206, or is on a timer and only periodically sends out information to the RFID interrogators 206. In the active mode, communication can be initiated by the RFID tag 204.

Each RFID interrogator 206 is capable of determining a distance from that RFID interrogator 206 and a specific RFID tag 204, using techniques known to those skilled in the art, including but not limited to Doppler shifting (change in frequency in an electromagnetic signal being electronically "bounced" off an RFID tag 204), and timing delta (measurement of the amount of time required for an RFID tag 204 to respond to an RFID interrogation from the RFID interrogator 206. By taking a distance measurement from multiple RFID interrogators 206, then the exact coordinate position of a particular RFID tag 204 (and its attached vehicle 202) can be determined by known methods of "triangulation." This coordinate location is then used to identify, using a look-up table in a database, the specific row and/or space number in which the vehicle is parked, in order to help the sales representative and customer find the vehicle. By this process of triangulation, for example, the location of vehicle 202-*a* may be determined to be on Row A, Space 2.

A wireless RFID controller/server 208 contains a database of vehicles stored on a local inventory lot 200, as well as other vehicles available on other lots or in transit. Information stored in each RFID tag 204 can be updated by the wireless RFID controller/server 208, and vice versa. Wireless RFID controller/server 208 is able to wirelessly communicate with a wireless tablet computer 210, as well as a network 124 (either wirelessly or via a wired connection such as an Ethernet). Wireless RFID controller/server 208 and wireless tablet computer 210 can each use the hardware configuration of data processing system 100 shown in FIG. 1.

Wireless table computer 210, which alternatively may be any data processing system, either wireless or wired, is preferably available to a sales representative for identifying and locating a vehicle 202 as described in detail below. Note that vehicle 202 is defined as any vehicle, including those for land, air or sea travel, such as cars, trucks, boats, aircraft, etc.

Figure 3A:
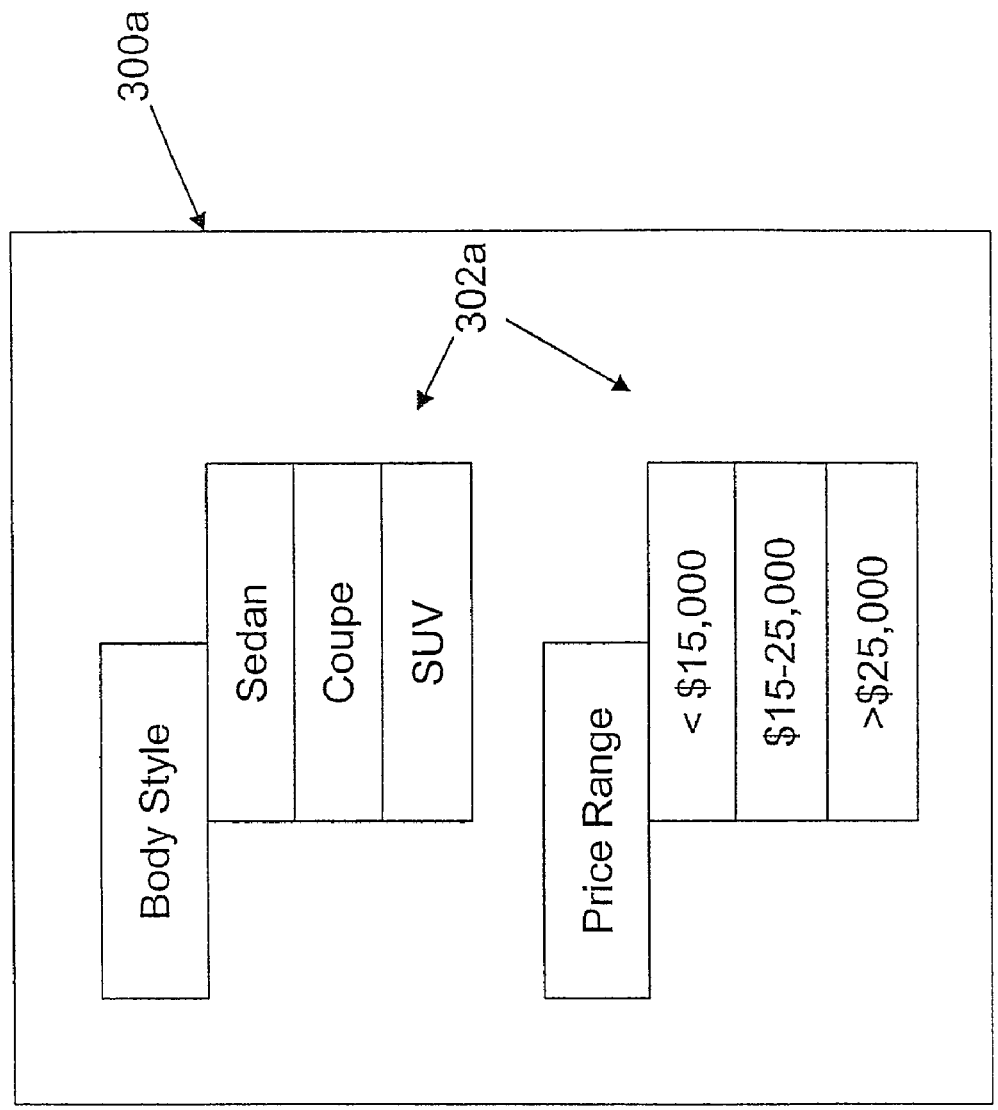
FIGS. 3*a-c* show sequential graphical user interfaces (GUIs), displayed on the wireless tablet computer, that describe choices and results based on the customer's requirements.

With reference now to FIG. 3*a*, there is depicted a graphical user interface (GUI) 300*a* displayed on a display (such as display 106 shown in FIG. 1) on a computer (such as wireless tablet computer 210 shown in FIG. 2). GUI 300*a* includes drop down active windows 302*a*, which may be actively selected using a stylus pen, cursor controller (mouse), etc. Shown for exemplary purposes, GUI 300*a* shows three choices for a body style of a vehicle, including "Sedan," "Coupe," or "SUV." Similarly, three choices of price ranges are given.

In a preferred embodiment of the present invention, a sales representative at a car dealership meets with a potential customer. As the customer tells the sales representative what characteristics are important in the type of vehicle he is interested in buying, the sales representative selects the appropriate choice. For example, assume that the customer wants a coupe that costs less than $15,000. The sale representative selects the appropriate active windows 302*a*, which causes the wireless RFID controller/server 208 shown in FIG. 2 to search a database for available vehicles (preferably on a local vehicle lot) that meet the selected criteria.

Figure 3B:
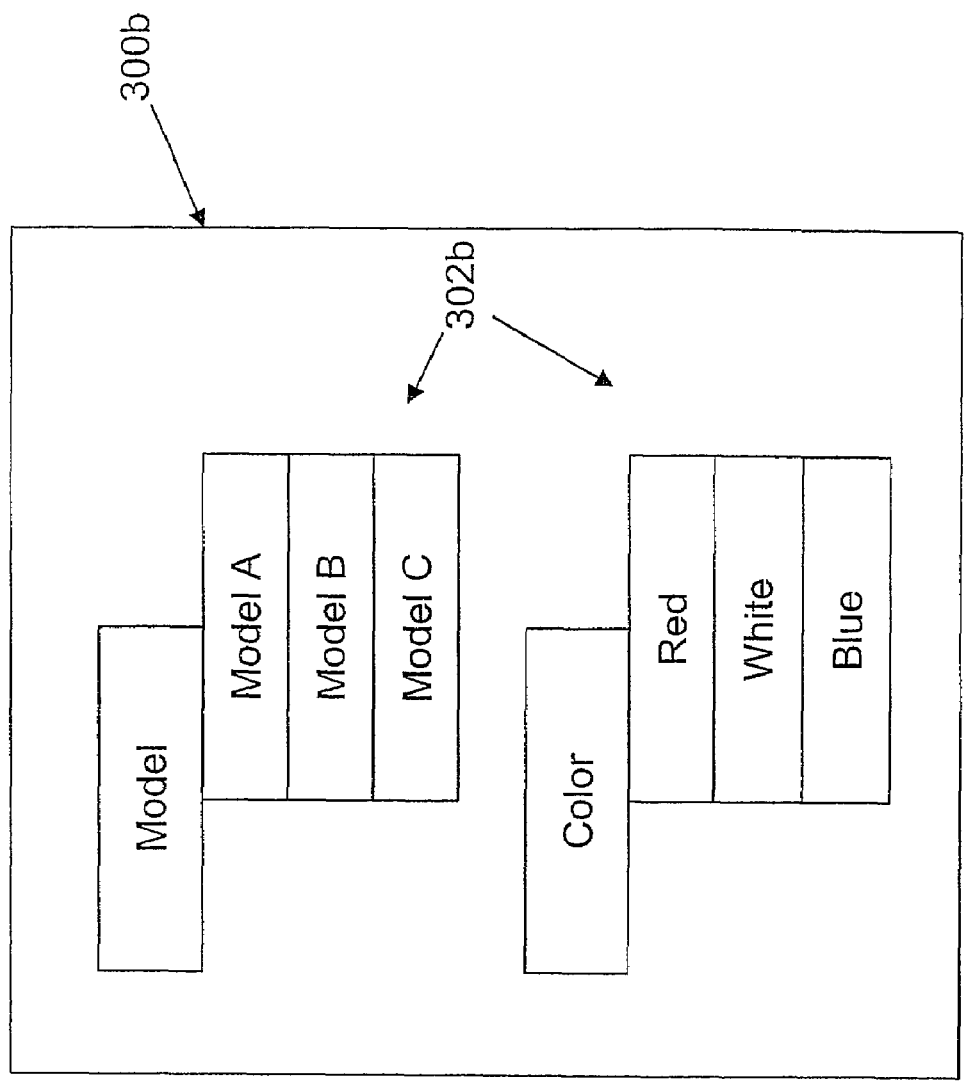
Figure 3C:
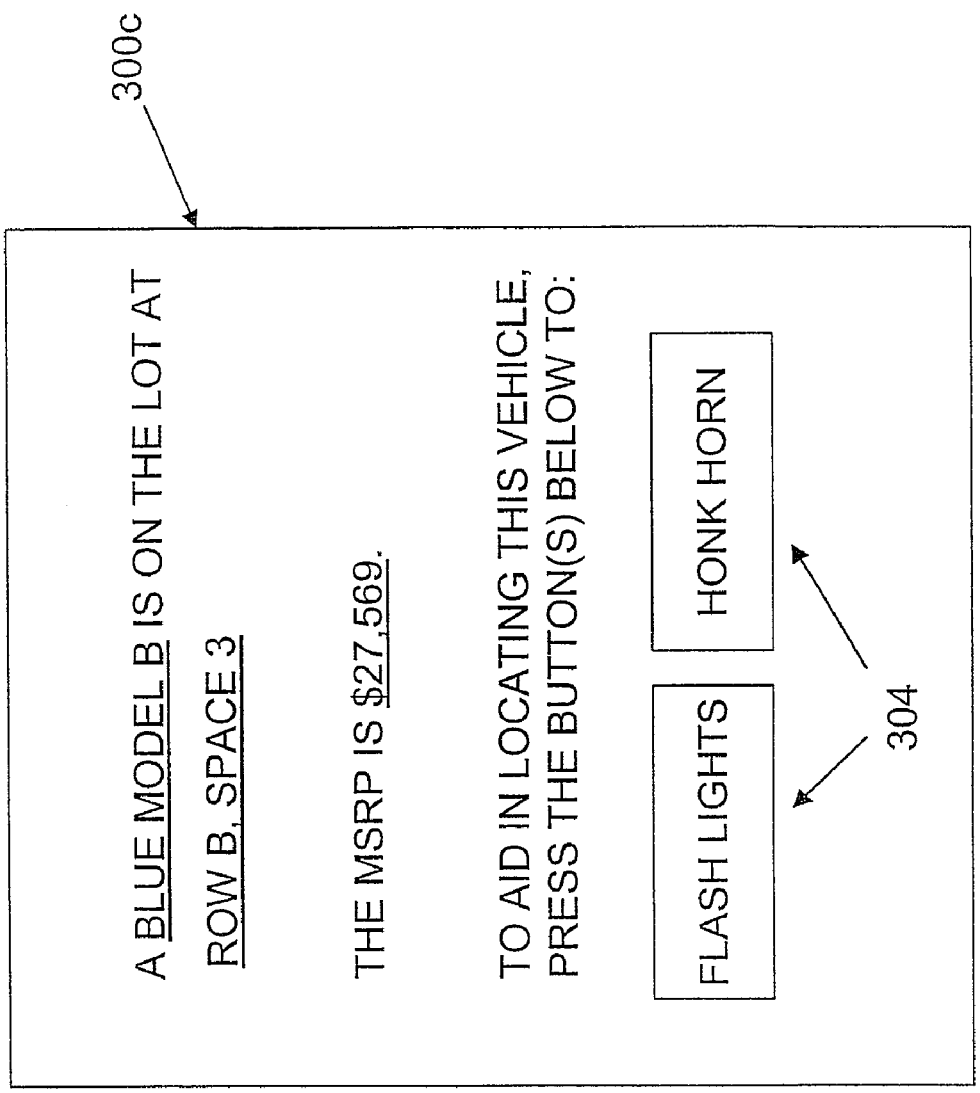

Upon locating vehicles, which are preferably presently located in a local inventory lot, that match the needs of the customer, RFID controller/server 208 then sends a new page shown in FIG. 3*b* as GUI 300*b*. Drop down windows 302*b* show available appropriate vehicles. Assume that the customer selects a Blue "Model B" vehicle. After the sales representative activates the appropriate active windows 302*b*, wireless RFID controller/server 208 searches its database, and/or interrogates, via RFID interrogators 206, the RFID tags 204 on the vehicles 202 shown in FIG. 2. Wireless RFID controller/server 208 then sends a new page shown in FIG. 3*c* as GUI 300*c*, showing the location (Row B, space 3) and price ($27,589) of the selected vehicle. Note also that GUI 300*c* includes locator option buttons 304 that, if selected, will cause wireless RFID controller/server 208 to remotely turn on the horn and/or lights of the selected vehicle (using a remote horn/light activation feature on the vehicle 202).

Figure 3D:
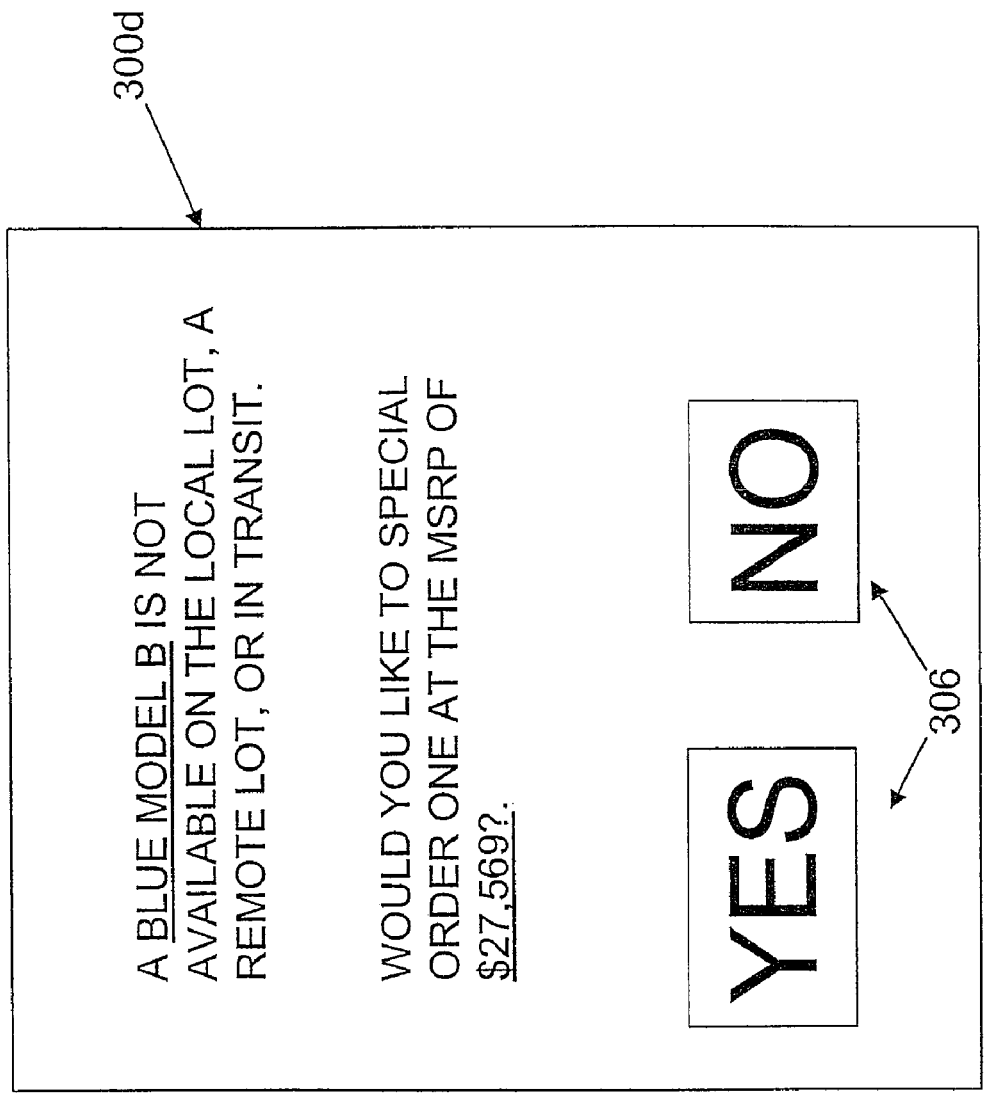
FIGS. 3*d-e* shows GUIs offering an option to special order an unavailable vehicle using the wireless tablet computer.
Figure 3E:
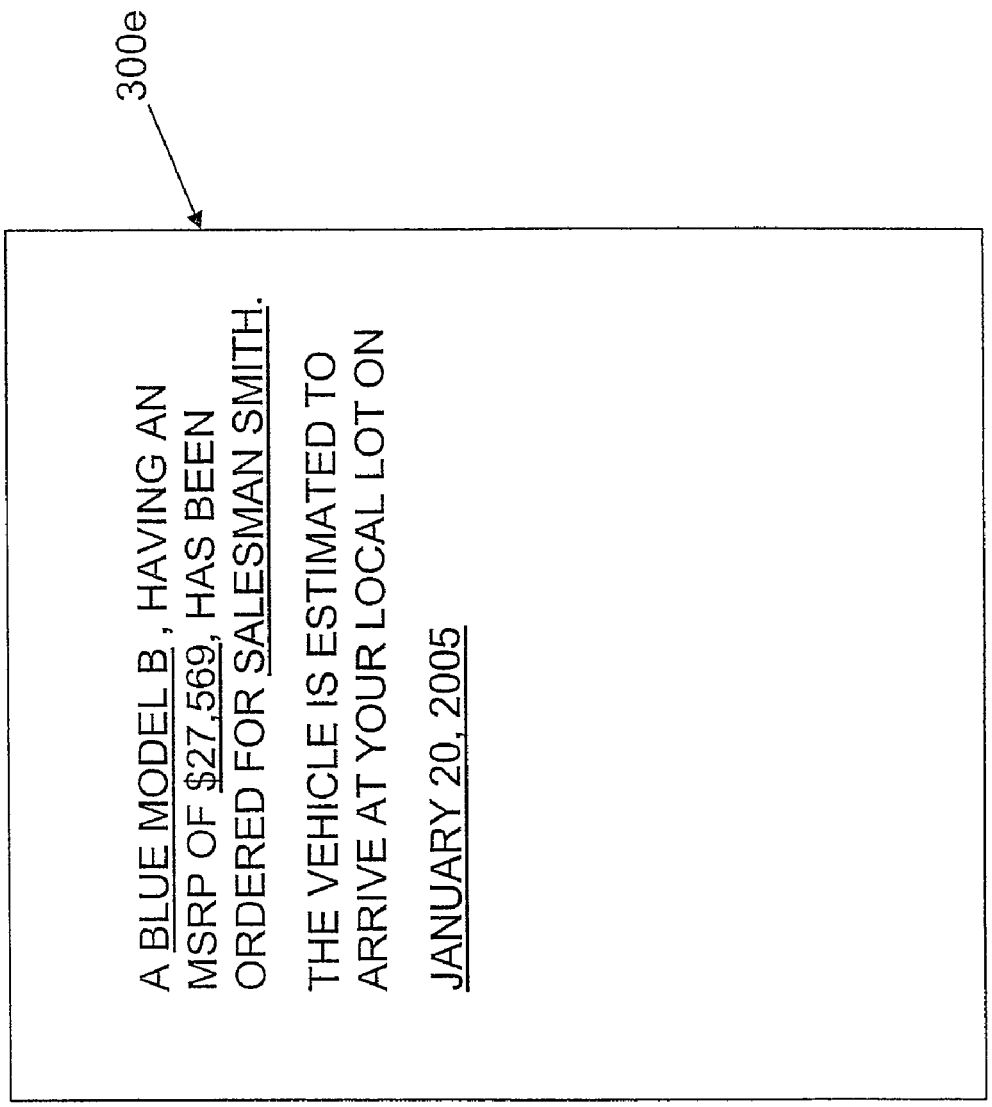

With reference now to FIG. 3*d*, a GUI 300*d* is shown offering the salesman the option of ordering the desired vehicle from a computer, such as but not limited to the wireless tablet computer 210. Option buttons 306, if clicked, will result in an automatic ordering of the "Blue Model B" via the network 124 shown in FIG. 2. The inventory server 126 shown in FIG. 1 can access its databank, determine that the Blue Model B can still be ordered from the manufacturer at the suggested MSRP. If the "Yes" button is selected, then a subsequent GUI 300*e*, as shown in FIG. 3*e*, will appear, showing the estimated arrival date of the ordered vehicle. Note also that the Wireless RFID Controller/Server 208 knows which salesman is using the wireless tablet computer 210, preferably by the salesman logging on with his UserID at the initiation of his use for the day. Thus, the special automatic ordering will be in the name of the salesman. Alternatively, the salesman can enter the name of the interested customer (entry window not shown).

Next, consider a scenario in which the desired vehicle is not on a local vehicle lot. If the desired vehicle, identified by the database stored in (or otherwise available to) wireless RFID controller/server 208, is on a remote vehicle lot, then a similar process as described above can be utilized, thus providing locating information to the sales representative when calling or going to the remote vehicle lot. However, there may be times in which the desired vehicle is neither in a local or remote lot, or being test driven, but rather is in transit.

Figure 4A:
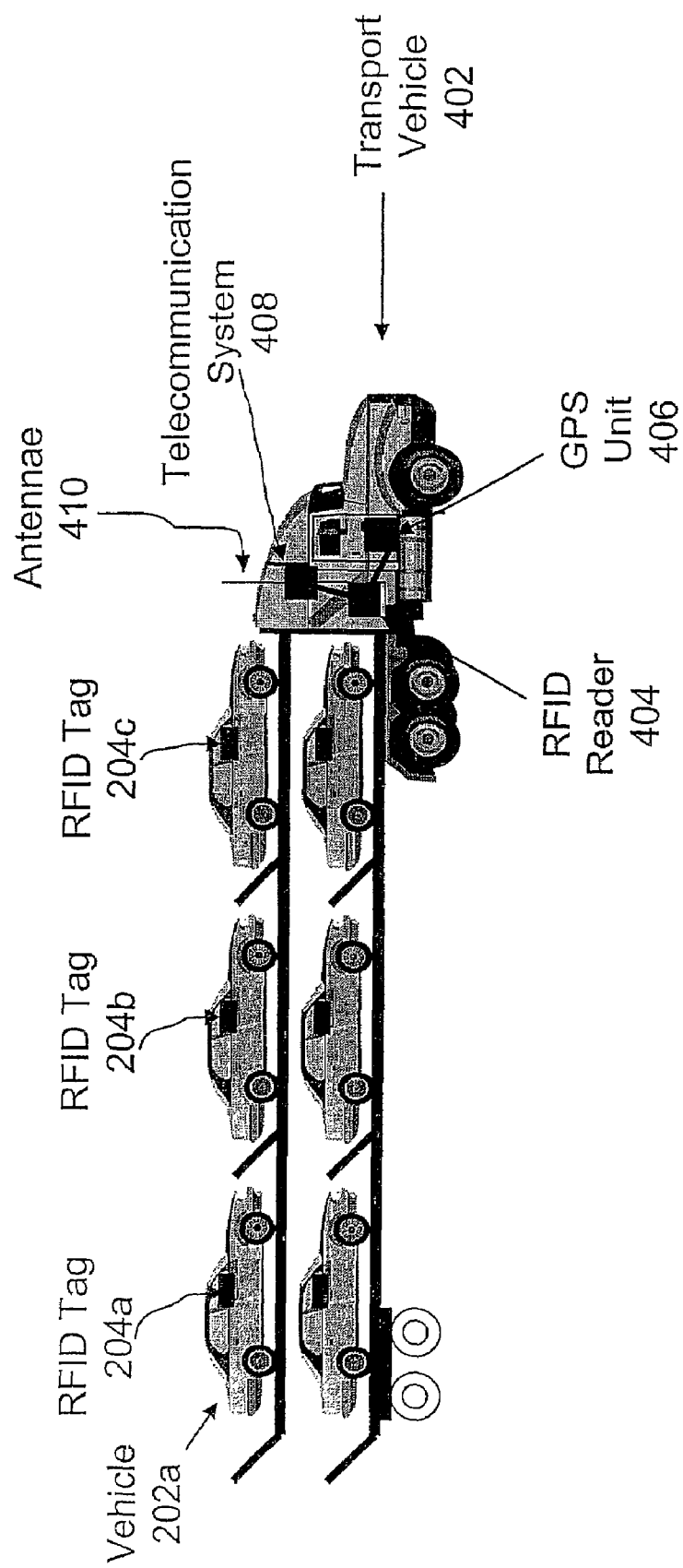
FIG. 4*a* illustrates a transport vehicle having an ability to provide real time data regarding a location of a specific vehicle in transit.

Referring then to FIG. 4a, a transport vehicle 402 is shown. Loaded on transport vehicle 402 are multiple vehicles, each having a unique RFID tag 204 (including the shown RFID tags 204a-c) attached to the vehicle. Transport vehicle 402 has on-board an RFID reader 404, which includes (not shown) a transceiver and decoder for reading information from RFID tags 204. Preferably, RFID reader 404 has a range that is so limited as to allow RFID reader 404 to only read the RFID tags 204 being transported by transport vehicle 402.

Transport vehicle 402 also has on-board a Global Positioning System (GPS) unit 406, which is capable of identifying exactly where the transport vehicle 402 is located in real time. RFID reader 404 and GPS unit 406 are coupled to a telecommunications system 408, having an antenna 410, which allows telecommunication between transport vehicle 402 and, preferably, wireless RFID controller/server 208, either directly or via network 124, shown in FIG. 2.

Telecommunication system 408 includes hardware and software that combines information from RFID reader 404 and GPS unit 406 into a real-time packet of data that describes exactly where a vehicle in transit is located. For example, logic in telecommunication system 408 may combine data from RFID tag 204a with real-time data from GPS unit 406 to describe the fact that vehicle 202a is currently at a real-time truck location 414, as shown in a GUI 412 in FIG. 4b.

GUI 412, which may be displayed on wireless tablet computer 210 shown in FIG. 2, or on any other computer (preferably) at a local dealership, shows a map that includes the real-time truck location 414 of transport vehicle 402. An icon 416 shows a direction and location that transport vehicle 402 is traveling. Optionally, icon 416 can be an active field that, when clicked, displays information on some or all of the vehicles 202 being transported on transport vehicle 402, according to information from their attached RFID tags 204.

Figure 4B:
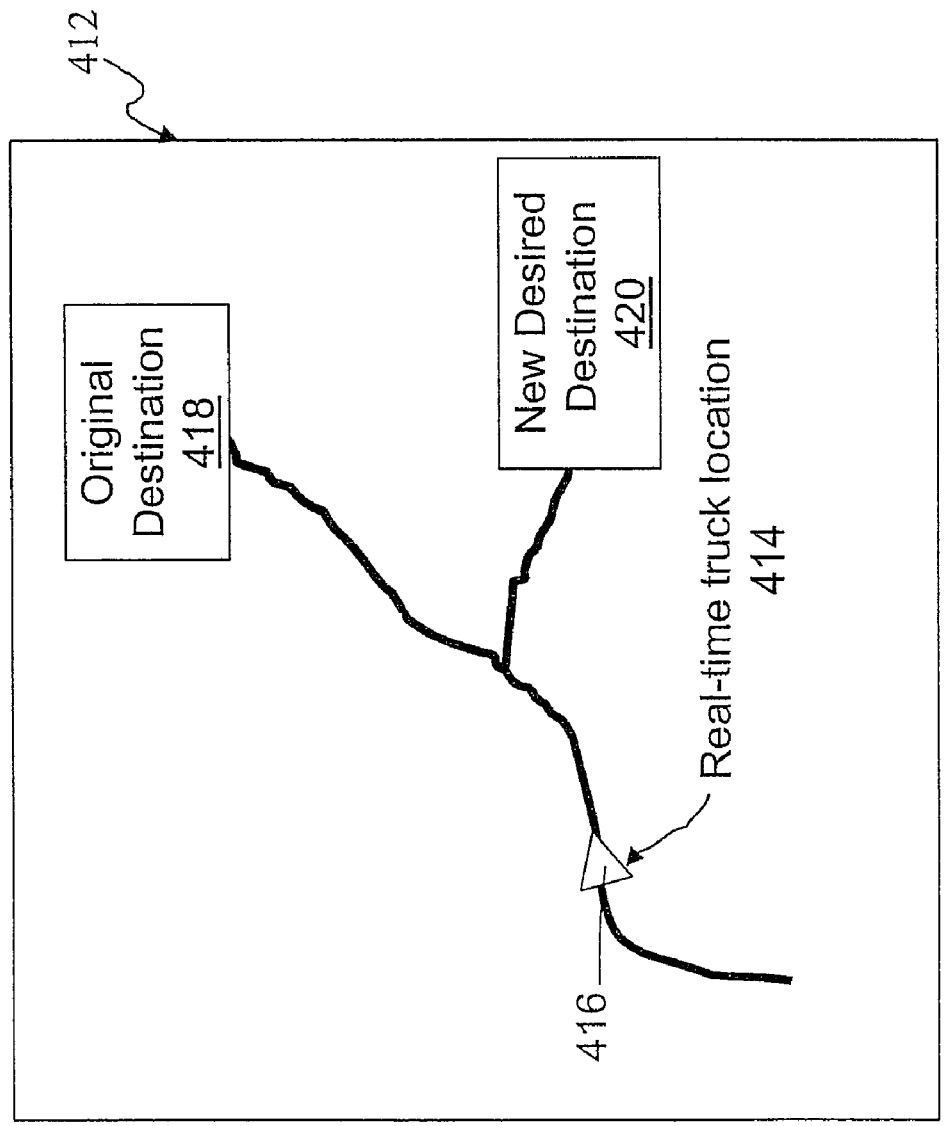
FIG. 4*b* is a GUI on a computer screen showing a map and location of the transport vehicle in real time.

Referring still to FIG. 4b, assume that a particular vehicle 202 is destined for original destination 418, which may be another dealership, a remote vehicle lot, etc. The map shown in GUI 412 shows that a selected vehicle 202, which has not been pre-sold, could be easily re-routed to a new desired destination 420 (such as a dealer's local lot). This re-routing can be accomplished by manually calling the driver of the transport vehicle 402 (via radio, cell phone, PDA, et al.), or by generating a computer signal to an on-board computer (not shown) on the transport vehicle 402 instructing the driver to divert to the new desired destination 420.

Figure 5A:
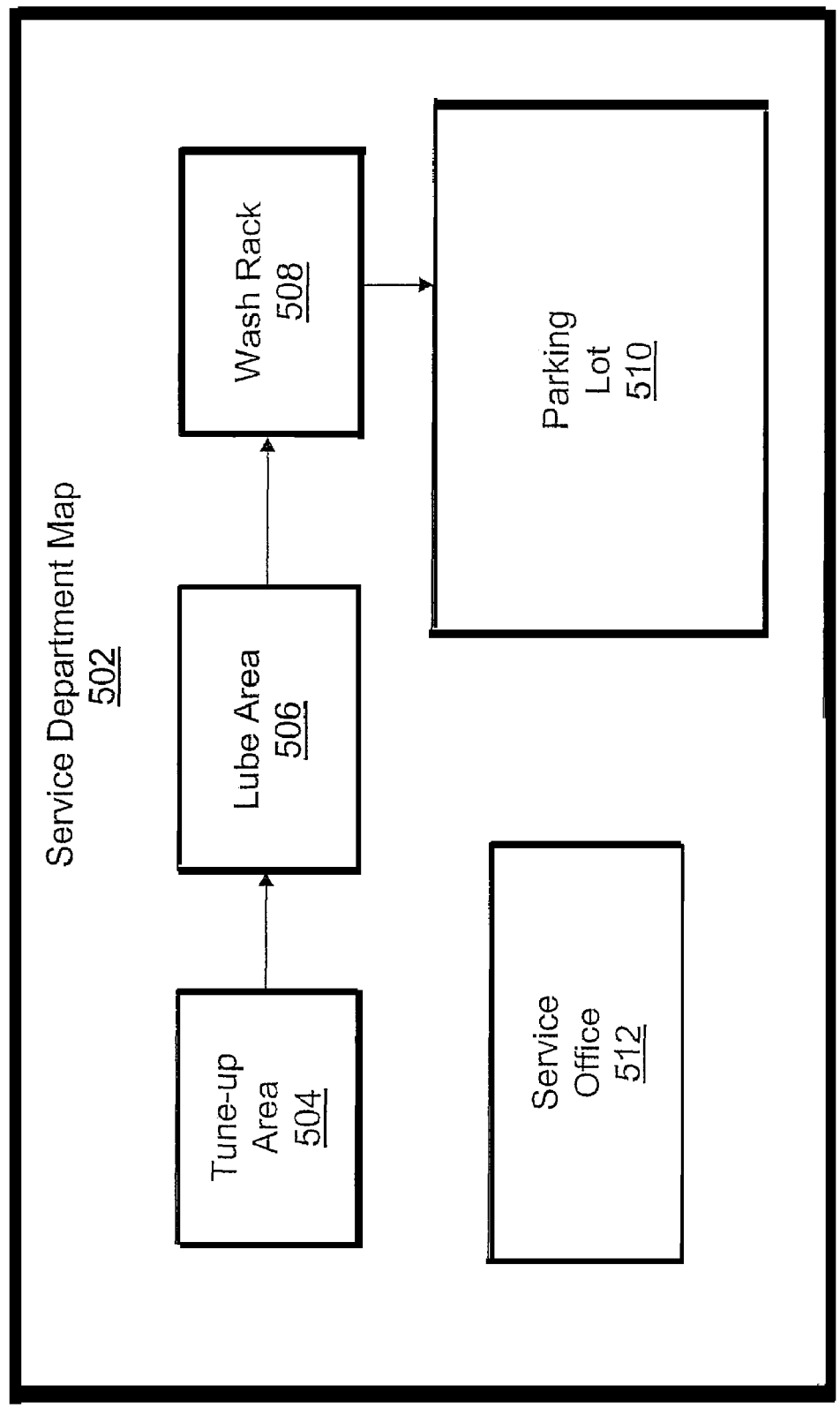
FIG. 5*a* is a map of a service department showing a routing order for a vehicle being serviced.

Besides needing to locate a vehicle for sale, it is also desirable to track vehicles that are in the process of being serviced. With reference now to FIG. 5a, a service department map 502 is shown. Within the service department are a tune-up area 504, a lube area 506, a wash rack 508, and a parking lot 510, all of which can be monitored from a service office 512 as well as remotely, as described below.

Assume for exemplary purposes that a specific vehicle is scheduled to sequentially have work done in the tune-up area 504, lube area 506 and wash rack 508, and then, upon completion of the service work, is to be parked in the parking lot 510, as shown by the flow arrows. Also assume that this specific vehicle (not shown) has an attached RFID tag (as described above), and that tune-up area 504, lube area 506, wash rack 508, and parking lot 510 all have adequate RFID interrogators (also described above) to determine which of these areas presently has the vehicle. This determination may be made by the triangulation process described above, or may be through the use of low-power RFID interrogators that, because of their low power, are only able to interrogate RFIDs in their area.

Figure 5B:
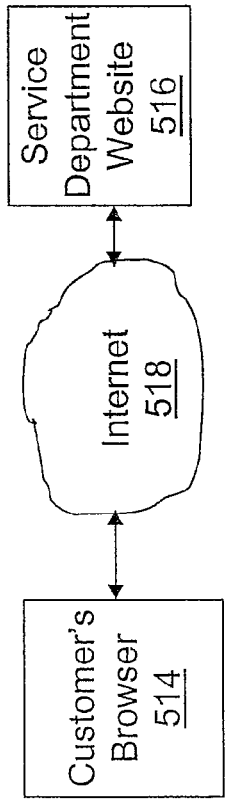
FIG. 5*b* depicts a block diagram of a network that allows a customer to remotely access a website showing a real time location of the vehicle being serviced.
Figure 5C:
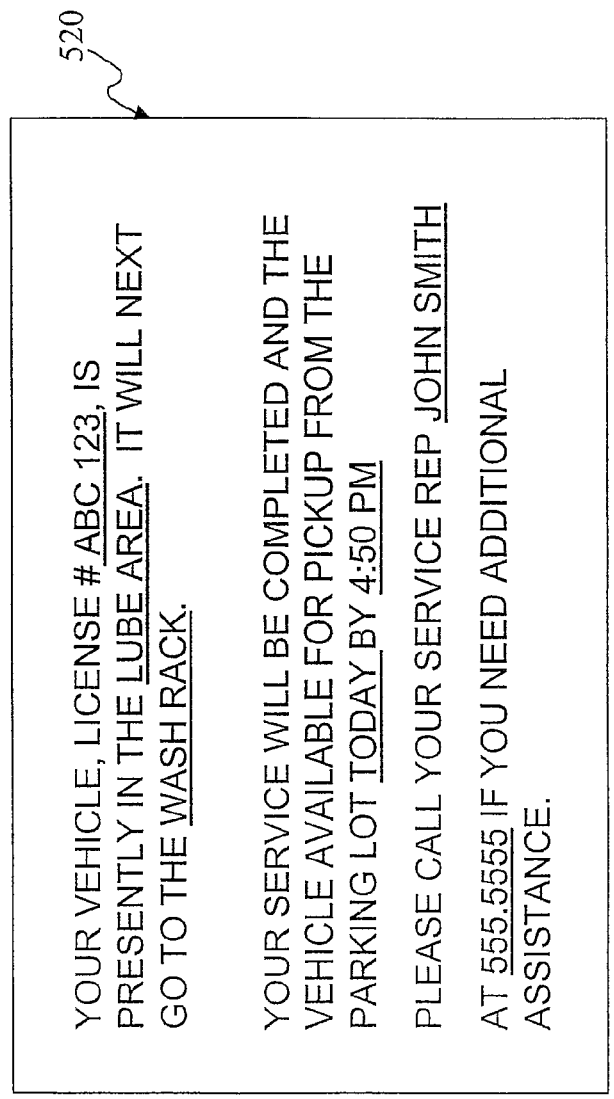
FIG. 5*c* is a GUI showing the status of the vehicle being serviced.

As shown in FIG. 5b, a customer's browser 514 can access a service department website 516 via a network, such as an Internet 518. After logging into the base website, and inputting the vehicle's service number, license plate, or other identifier into an active field, a webpage 520 is sent to the customer's browser 514. An exemplary webpage 520, as shown in FIG. 5c, shows the current status of the service work by showing where the vehicle is currently located, as well as when all service should be completed (as calculated by its location). Thus, the customer can check the status of his vehicle's service on-line without involving a service representative. Alternatively, an electronic message can be sent to the customer, either manually or automatically when the vehicle is in any selected area, informing the customer of the status of his service work. The message can be sent as an e-mail, a cell phone text message, a page signal, or any other electronic message media that is desired.

With reference now to FIG. 6, a flow chart of steps taken in a preferred embodiment to locate a vehicle for purchase is depicted. After initiator block 600, a sales representative enters the customer's desired vehicle features into his wireless tablet computer (block 602), as described in detail above. Information from all RFID tags on vehicles on the lot are read (block 604), and a desired vehicle is located based on a match of the customer's desired vehicle features with information from one or more RFIDs (block 606). If the desired vehicle is on the local inventory lot (query block 608), then the sales representative is so notified of the vehicle's location on his tablet computer (block 610), and the vehicle's horn/lights are optionally flashed on to aid in locating the vehicle. Preferably, the location of the vehicle is described as being on a named row and/or space.

If the desired vehicle is not on the local lot, then its location is determined (block 612) as either being in another lot or else as being in transit (query block 614). If it is on another remote lot, then that remote lot has an infrastructure as described above for the local lot, and the specific location of the vehicle is sent to the sale representative. If the desired vehicle is in transit, then the sales representative is so notified and the vehicle is optionally re-routed to the local inventory lot (block 616), where the process end (terminator block 618).

The present invention thus provides an effective way for an RFID tag-equipped vehicle to be identified, located, and tracked for sales and service purposes. The invention reduces customer frustration, and also improves inventory control.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention. For example, while the present invention is described for locating and tracking a vehicle such as an automobile, the present invention is also useful in tracking any product capable of being attached to an RFID tag or any similar wireless device.

What is claimed is:

1. A method for tracking a progress of a product that is receiving scheduled product maintenance service, the method comprising:
    attaching a radio frequency identifier (RFID) to a product;
    using the RFID to locate the product within a service area;
    determining a coordinate position of the product within the service area by triangulating onto the location of the product using one or more local base transmitters that can interrogate the RFID;
    assigning a space identifier to each space within the service area;
    associating the coordinate position of the product with one of the space identifiers;
    providing a real-time location for the product within the service area to a website, and
    accessing the website to determine a progress status of scheduled product maintenance service being performed on the product.

2. The method of claim 1, wherein the product is a vehicle.

3. The method of claim 2, further comprising:
    in response to determining that the vehicle is in a parking lot in which RFIDs are monitored, automatically sending a customer an electronic message notifying the customer that service for the vehicle is complete.

4. The method of claim 1, further comprising:
    upon determining the location of the vehicle, sending a signal from a local transmitter to unlock the vehicle.

5. The method of claim 1, further comprising:
    upon determining the location of the vehicle, sending a signal from a local transmitter to flash on lights on the vehicle.

6. The method of claim 1, further comprising:
    upon determining the location of the vehicle, sending a signal from a local transmitter to honk a horn on the vehicle.

7. The method of claim 1, wherein the real-time location of the product within the service area is determined according to a pre-determined order of service steps to be taken on the product.

8. A method for tracking a progress of a product that is being repaired, the method comprising:
    attaching a radio frequency identifier (RFID) to a product;
    using the RFID to locate the product within a repair area;
    determining a coordinate position of the product within the repair area by triangulating onto the location of the product using one or more local base transmitters that can interrogate the RFID;
    assigning a space identifier to each space within the repair area;
    associating the coordinate position of the product with one of the space identifiers;
    providing a real-time location for the product within the repair area to a website; and
    accessing the website to determine a progress status of repair work that is being performed on the product.

9. The method of claim 8, wherein the product is a vehicle.

10. The method of claim 9, further comprising:
    in response to determining that the vehicle is in a parking lot in which RFIDs are monitored, automatically sending a customer an electronic message notifying the customer that the repair work for the vehicle is complete and identifying the space within the repair area at which the vehicle is located.

11. A computer-readable storage medium encoded with a computer program for tracking a progress of a product that is receiving scheduled product maintenance service, the computer program comprising computer executed instructions configured for:
    receiving product identification from a radio frequency identifier (RFID) that is attached to a product;
    using the RFID to locate the product within a service area;
    determining a coordinate position of the product within the service area by triangulating onto the location of the product using one or more local base transmitters that can interrogate the RFID;
    assigning a space identifier to each space within the service area;
    associating the coordinate position of the product with one of the space identifiers;
    providing a real-time location for the product within the service area to a website;
    enabling access to the website to determine a progress status of scheduled product maintenance service being performed on the product.

12. The computer-readable storage medium of claim 11, wherein the product is a vehicle.

13. The computer-readable storage medium of claim 12, wherein the computer executed instructions are further configured for:
    in response to determining that the vehicle is in a parking lot in which RFIDs are monitored, automatically sending a customer an electronic message notifying the customer that service for the vehicle is complete.

14. The computer-readable storage medium of claim 11, wherein the computer executed instructions are further configured for:
    upon determining the location of the vehicle, sending a signal from a local transmitter to unlock the vehicle.

15. The computer-readable storage medium of claim 14, wherein the computer executed instructions are further configured for:
    upon determining the location of the vehicle, sending a signal from a local transmitter to flash on lights on the vehicle.

16. The computer-readable storage medium of claim 14, wherein the computer executed instructions are further configured for:
    upon determining the location of the vehicle, sending a signal from a local transmitter to honk a horn on the vehicle.

* * * * *